(12) United States Patent
Kim (10) Patent No.: US 7,522,227 B2
(45) Date of Patent: Apr. 21, 2009

(54) LIQUID CRYSTAL DISPLAY DEVICE AND METHOD FOR FABRICATING THE SAME

(75) Inventor: Eun Hong Kim, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/003,610

(22) Filed: Dec. 28, 2007

(65) Prior Publication Data

US 2008/0225196 A1    Sep. 18, 2008

(30) Foreign Application Priority Data

Mar. 13, 2007    (KR) .................. 10-2007-0024282

(51) Int. Cl.
*G02F 1/1333*    (2006.01)
*G02F 1/1343*    (2006.01)
*G02F 1/13*    (2006.01)

(52) U.S. Cl. .................. 349/54; 349/139; 349/192
(58) Field of Classification Search .................. 349/46, 349/54, 55, 139, 149, 192
See application file for complete search history.

(56) References Cited

U.S. PATENT DOCUMENTS

2001/0035920 A1*    11/2001    Choi .......................... 349/54

* cited by examiner

*Primary Examiner*—Brian Healy
*Assistant Examiner*—Michael P Mooney
(74) *Attorney, Agent, or Firm*—Morgan, Lewis & Bockius LLP (57) ABSTRACT

A liquid crystal display device and a method for fabricating the same are disclosed. The liquid crystal display device includes a plurality of gate lines and data lines defining pixel regions on a substrate, thin-film transistors formed at intersections of the gate lines and the data lines, pixel electrodes formed at the respective pixel regions and connected with the thin-film transistors, a first common electrode and a second common electrode overlapped with both side portions of each pixel electrode to extend parallel to the data lines, an opened region of the first common electrode to divide the first common electrode into two parts in each pixel region, a connecting electrode overlapped with both separated portions of an open data line and the pixel electrode adjacent to the open data line, the connecting electrode being connected with both the separated portions of the open data line by use of welding points, and a cutting line to divide the pixel electrode into a first portion connected with the connecting electrode and a second portion connected with an associated one of the thin-film transistors, the cutting line passing through the opened region of the first common electrode.

15 Claims, 7 Drawing Sheets

LIQUID CRYSTAL DISPLAY DEVICE AND METHOD FOR FABRICATING THE SAME

This application claims the benefit of the Korean Patent Application No. P2007-0024282, filed Mar. 13, 2007, which is hereby incorporated by reference as if fully set forth herein.

BACKGROUND OF THE INVENTION

1. Field of the Invention

The present invention relates to a liquid crystal display device, and more particularly, to a liquid crystal display device and a method for fabricating the same, which can repair an open defect in a data line.

2. Discussion of the Related Art

Generally, a liquid crystal display device includes a liquid crystal panel to display an image by use of electrical and optical characteristics of liquid crystals, and a drive unit to apply a drive signal to the liquid crystal panel.

The liquid crystal panel includes first and second substrates bonded to each other with a predetermined gap therebetween, and a liquid crystal layer formed between the first and second substrates. The fabrication of the liquid crystal panel is generally divided into a thin-film transistor array process to form thin-film transistors on the first substrate, and a color filter array process to form color filters on the second substrate. If the first substrate having a thin-film transistor array is bonded to the second substrate having a color filter array via a cell process such that the liquid crystal layer is interposed between the first and second substrates, the liquid crystal panel is completed.

The completed liquid crystal panel is subsequently subjected to an inspection process, to determine whether or not the liquid crystal panel has a defect. If the liquid crystal panel is determined as a perfect product having no defect, a polarizer is attached to a surface of the liquid crystal panel. Then, by connecting a drive circuit to the liquid crystal panel, the liquid crystal display device is completed.

Here, the inspection process for the liquid crystal panel is performed in such a manner that a test screen is displayed on the liquid crystal panel, so as to detect the presence of defective pixels. In addition, after completing the thin-film transistor array process, it is inspected, using certain equipment, whether or not the completed thin-film transistor substrate has a defect. Representative examples of defects caused in the liquid crystal panel or thin-film transistor substrate include a pixel defect and an open defect in a data line. The pixel defect is represented as a dot form. Therefore, it is difficult for a user to recognize the pixel defect even if several pixel defects occur, and the liquid crystal panel or thin-film transistor substrate is not considered as a defective product. On the other hand, since the open defect in a data line is represented as a line form, the liquid crystal panel or thin-film transistor substrate is considered as a defective product even if only one open-data-line occurs, resulting in a deterioration in the fabrication yield of the liquid crystal display device.

SUMMARY OF THE INVENTION

Accordingly, the present invention is directed to a liquid crystal display device and a method for fabricating the same that substantially obviate one or more problems due to limitations and disadvantages of the related art.

An object of the present invention is to provide a liquid crystal display device and a method for fabricating the same, which can repair an open defect in a data line.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprising: a plurality of gate lines and data lines defining pixel regions on a substrate; thin-film transistors formed at intersections of the gate lines and the data lines; pixel electrodes formed at the respective pixel regions and connected with the thin-film transistors; a first common electrode and a second common electrode overlapped with both side portions of each pixel electrode to extend parallel to the data lines; an opened region of the first common electrode to divide the first common electrode into two parts in each pixel region; a connecting electrode overlapped with both separated portions of an open data line and the pixel electrode adjacent to the open data line, the connecting electrode being connected with both the separated portions of the open data line by use of welding points; and a cutting line to divide the pixel electrode into a first portion connected with the connecting electrode and a second portion connected with an associated one of the thin-film transistors, the cutting line passing through the opened region of the first common electrode.

In accordance with another aspect of the present invention, there is provided a method for fabricating a liquid crystal display device comprising: forming a plurality of gate lines and data lines defining pixel regions on a substrate; forming thin-film transistors at intersections of the gate lines and the data lines; forming pixel electrodes at the respective pixel regions so as to be connected with the thin-film transistors; forming a first common electrode and a second common electrode extending parallel to the data lines and overlapped with both side portions of each pixel electrode; forming an opened region of the first common electrode to divide the first common electrode into two parts in each pixel region; forming a connecting electrode to be overlapped with both separated portions of an open data line and the pixel electrode adjacent to the open data line; electrically connecting both the separated portions of the open data line with the connecting electrode by use of welding points; forming a cutting line in the pixel electrode so as to pass through the opened region of the first common electrode; and dividing the pixel electrode, by use of the cutting line, into a first portion connected with the connecting electrode and a second portion connected with an associated one of the thin-film transistors.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
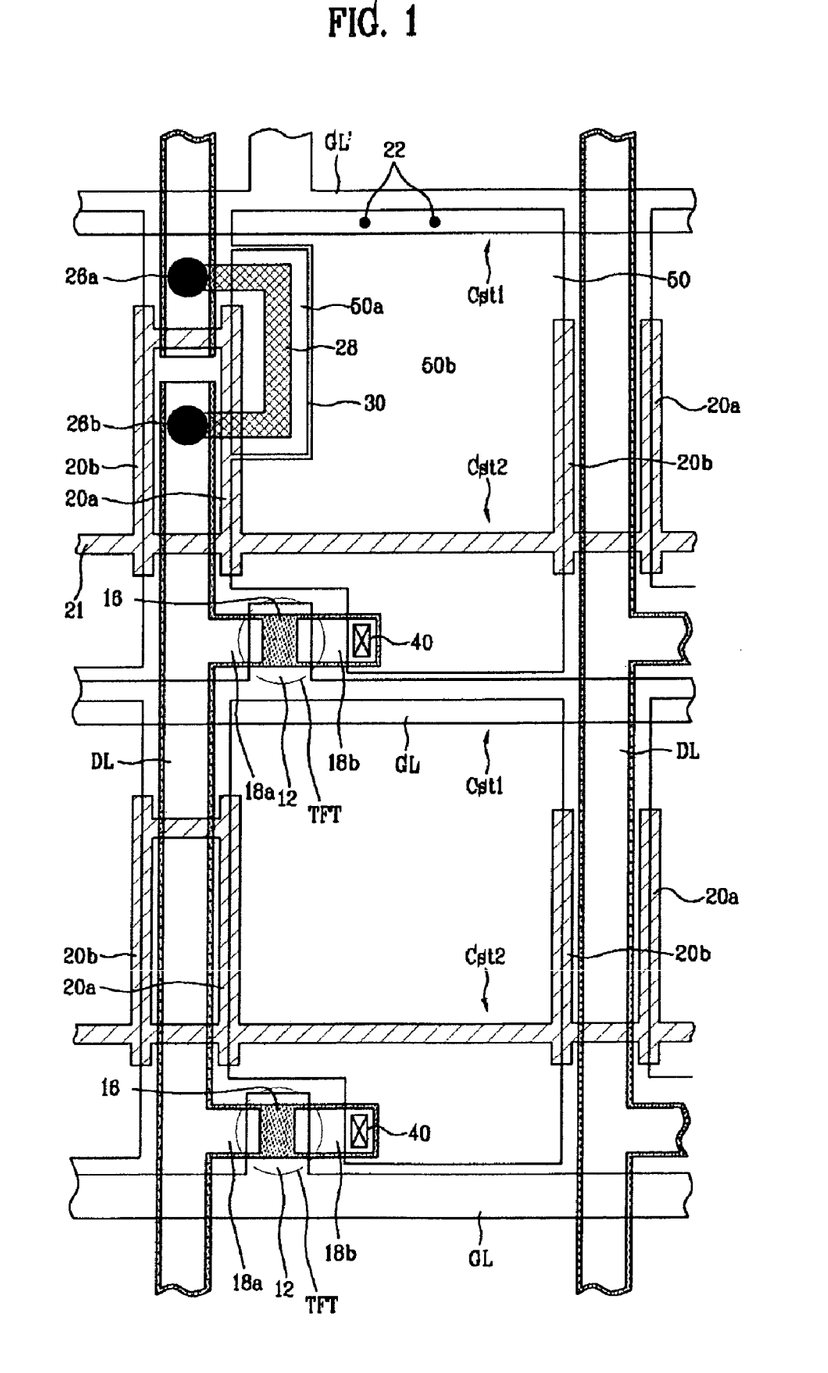
FIG. 1 is a plan view illustrating a liquid crystal display device according to a first embodiment of the present invention.

FIG. 1 is a plan view illustrating a thin-film transistor substrate of a liquid crystal display device according to a first embodiment of the present invention.

The thin-film transistor substrate shown in FIG. 1 includes a plurality of gate lines GL and data lines DL formed on a first substrate to intersect each other so as to define pixel regions, the gate lines GL and the data lines DL interposing a gate insulating layer therebetween, thin-film transistors TFT formed at intersections of the gate lines GL and the data lines DL, and pixel electrodes 50 formed at the respective pixel regions and connected with the thin-film transistors TFT.

Each of the thin-film transistors TFT includes a gate electrode 12 branched from the gate line GL, the gate insulating layer formed over a whole surface of the first substrate on which the gate electrode 12 is formed, a semiconductor layer 16 formed on the gate insulating layer so as to be overlapped with the gate electrode 12, a source electrode 18a branched from the data line DL and formed on the semiconductor layer 16, and a drain electrode 18b formed on the semiconductor layer 16 so as to face the source electrode 18a. Here, the semiconductor layer 16 is extended to also be overlapped with the data line DL.

Each of the pixel electrodes 50 is formed on a protective layer, and is connected with the drain electrode 18b through a contact hole 40 perforated in the protective layer. The pixel electrode 50 is overlapped with the previous stage gate line GL' while interposing the gate insulating layer and the protective layer between the pixel electrode 50 and the previous stage gate line GL', to form a first storage capacitor Cst1.

The thin-film transistor substrate further includes common lines 20, and first and second common electrodes 20a and 20b branched from the respective common lines 20 to be extended parallel to both sides of the data line DL.

Each common line 20 is overlapped with the pixel electrode 50 while interposing the gate insulating layer and the protective layer between the common line 20 and the pixel electrode 50, to form a second storage capacitor Cst2. Accordingly, the first and second storage capacitors Cst1 and Cst2 are connected parallel to each other, to increase the overall capacitance of the storage capacitors. This is effective to stably maintain the voltage of the pixel electrode 50. The first and second common electrodes 20a and 20b formed at both sides of the data line DL are connected with each other by means of a dummy electrode 21. Also, the first and second common electrodes 20a and 20b are overlapped with both side portions of the pixel electrode 50, to prevent the leakage of light between the pixel electrode 50 and the data lines DL adjacent to the pixel electrode 50. This has the effect of increasing a bonding margin with respect to a second substrate.

If the thin-film transistor substrate is completed, it is inspected, using equipment having a liquid crystal layer, whether or not the completed thin-film transistor substrate has a defect. To inspect a defect of the thin-film transistor substrate, first, the inspection equipment having a liquid crystal layer, more particularly, a modulator is located on the completed thin-film transistor substrate. Then, a test signal is applied to the thin-film transistor substrate to display a test image through the modulator, thereby inspecting the presence of a defective pixel and a defective line.

In the present invention, if an open defect in a data line is detected, a "C"-shaped connecting electrode 28 is formed by use of a laser chemical vapor deposition such that the connecting electrode 28 is overlapped with the data lines DL, which are separated from each other by an opened region therebetween. The connecting electrode 28 is also overlapped with the adjacent pixel electrode 50.

Subsequently, laser beams are irradiated onto first and second overlapped portions between the separated data lines DL and the connecting electrode 28, to weld the connecting electrode 28 with the data lines DL. Thereby, the connecting electrode 28 and the data lines DL are electrically connected with each other through first and second welding points 26a and 26b. Consequently, the separated data lines DL are connected with each other through the connecting electrode 28.

However, since the connecting electrode 28 connected with the data lines DL comes into contact with a first portion 50a of the pixel electrode 50, there is a risk of distortion of a signal from the data lines DL. To compensate for this problem, the first portion 50a of the pixel electrode 50 coming into contact with the connecting electrode 28 is separated from a second portion 50b of the pixel electrode 50b by a laser cutting line 30. Here, the second portion 50b of the pixel electrode 50 is connected with the thin-film transistor TFT.

Although the second portion 50b of the pixel electrode 50 can be driven by the thin-film transistor TFT, the second portion 50b has a smaller area than that of other normal pixel electrodes, and may cause a deviation in brightness under the condition of the same voltage. To solve this problem, laser beams are irradiated onto the previous stage gate line GL' overlapped with the second portion 50b of the pixel electrode 50, to weld the second portion 50b of the pixel electrode 50 with the previous stage gate line GL'. Thereby, the second portion 50b of the pixel electrode 50 is electrically connected with the previous stage gate line GL' through welding points 22. As a result, a gate signal is applied to the second portion 50b of the pixel electrode 50. Since the gate signal accompanies a low gate voltage for most of time, the low gate voltage having a large difference from a common voltage is also applied to the second portion 50b of the pixel electrode 50. As a result, the corresponding pixel is dark point, to display a black color.

As described above, the liquid crystal display device according to the first embodiment of the present invention can repair an open defect in a data line by connecting the resulting separated data lines with each other by use of a connecting electrode.

Although not shown in the drawings, the thin-film transistor substrate is bonded to a color filter substrate while interposing a liquid crystal layer therebetween. The color filter substrate includes a black matrix layer to prevent light from being transmitted onto a region of the second substrate except for the pixel regions, R, G, and B color filter layers to represent red, green, and blue colors, and a common electrode to apply a common voltage onto the color filter layers.

Figure 2:
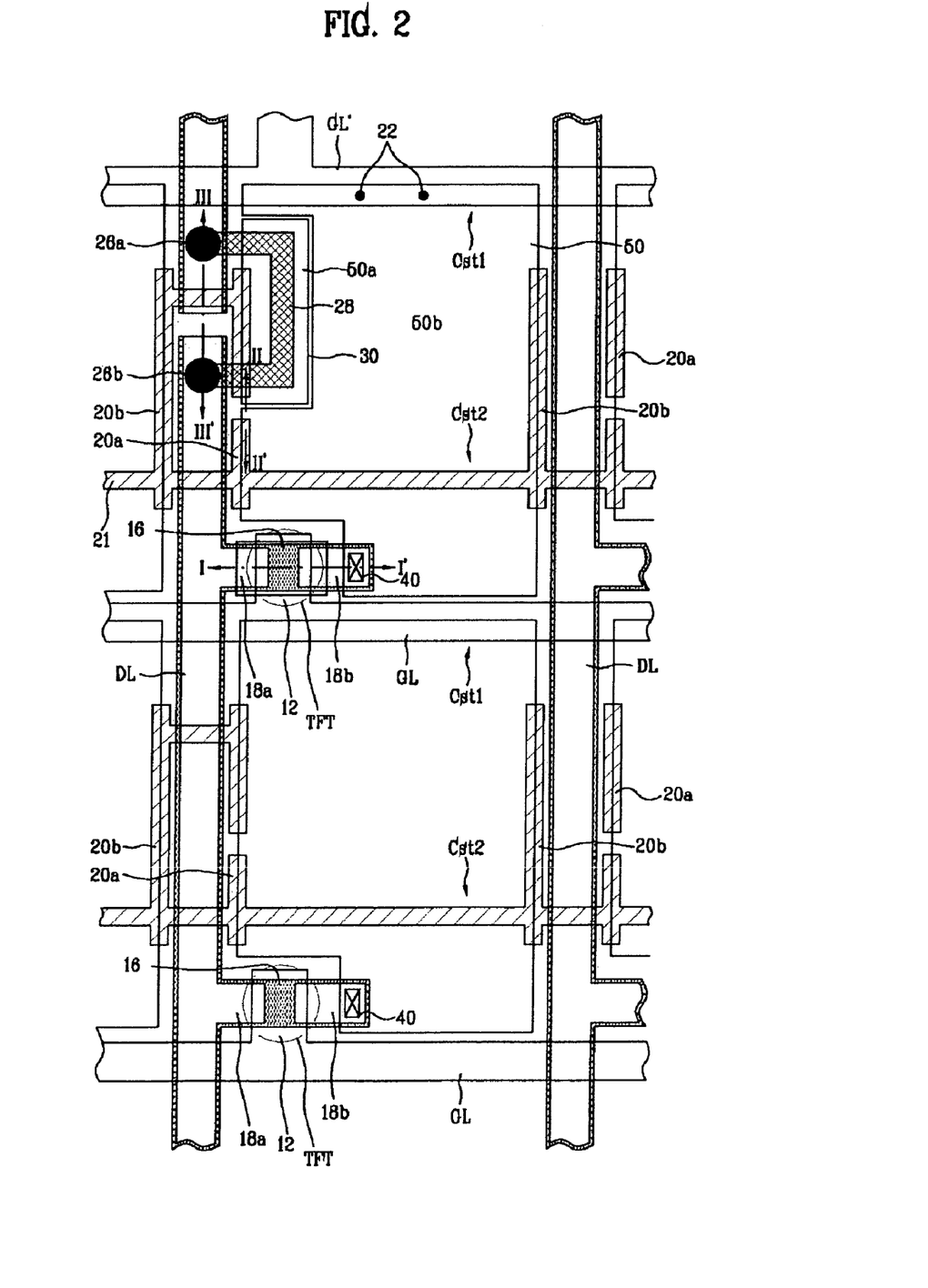
FIG. 2 is a plan view illustrating a liquid crystal display device according to a second embodiment of the present invention.

FIG. 2 is a plan view illustrating a thin-film transistor substrate of a liquid crystal display device according to a second embodiment of the present invention. The thin-film transistor substrate shown in FIG. 2 has the same constituent elements as those of the above described thin-film transistor substrate shown in FIG. 1 except for the configuration of the first common electrode, and thus, a description of the same constituent elements will be omitted.

Referring to FIG. 2, the first common electrode 20a is extended parallel to the data line DL, and has a predetermined open region. The open region of the first common electrode 20a is overlapped with the laser cutting region 30, which is used to separate the first portion 50a and the second portion 50b of the pixel electrode 50 from each other. Accordingly, after forming the connecting electrode 28 to repair an open defect in the data line DL, it is possible to prevent a short circuit between the first common electrode 20a and the pixel electrode 50 during a laser cutting of the pixel electrode 50.

FIGS. 3A to 3D are sectional views taken along the lines I-I' to III-III' of FIG. 2, illustrating a method for forming the thin-film transistor substrate of the liquid crystal display device. In the following description, constituent elements not shown in FIGS. 3A to 3D refer to FIG. 2.

Figure 3A:
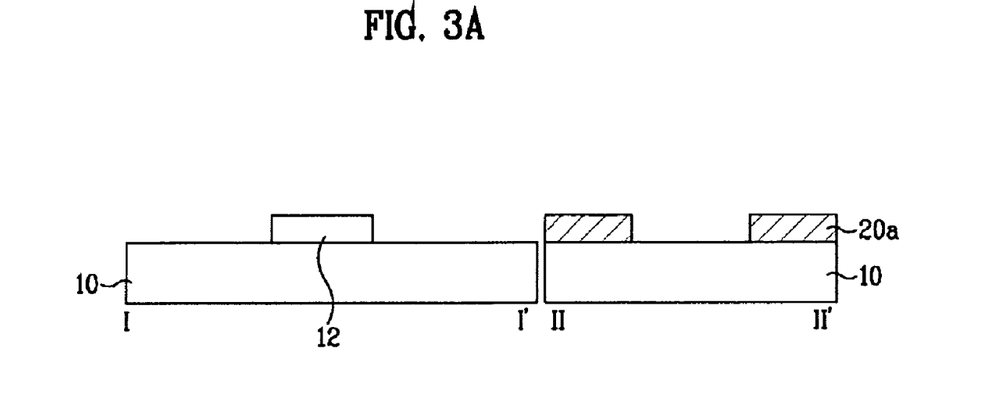
FIGS. 3A to 3D are sectional views taken along the lines I-I' to III-III' of FIG. 2, illustrating a process for forming a thin-film transistor substrate included in the liquid crystal display device.

Referring to FIG. 3A, the gate electrode 12 and the first common electrode 20a are formed together with the gate line GL, the common line 20, and the second common electrode 20b shown in FIG. 2.

More specifically, a gate metal layer is formed on the first substrate by deposition such as sputtering, etc. Then, the gate metal layer is patterned by a photolithography process using a first mask and an etching process, to form the gate line GL, the gate electrode 12, the common line 20, and the first and second common electrodes 20a and 20b. In this case, the first common electrode 20a is divided into two parts to have an opened region.

The gate metal layer is made of any one of molybdenum (Mo), titanium (Ti), tantalum (Ta), molybdenum-alloy (Mo-alloy), copper (Cu), and the like.

Figure 3B:
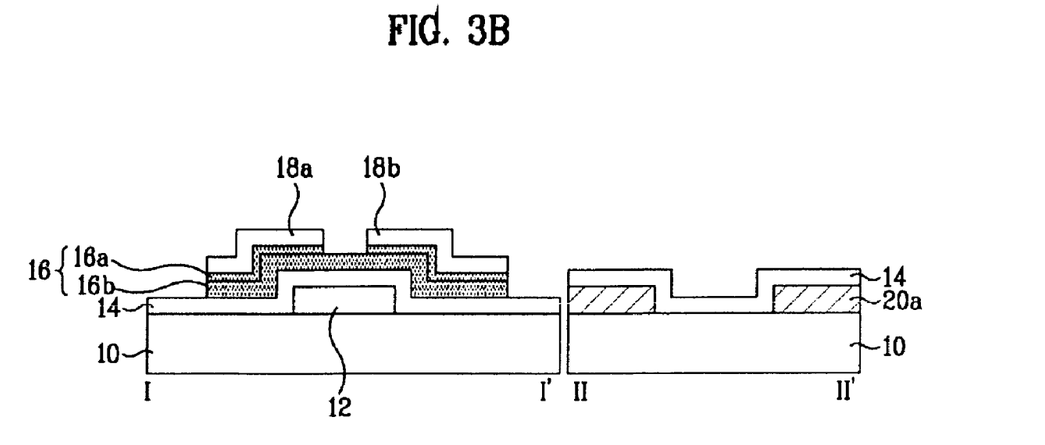

Referring to FIG. 3B, the gate insulating layer 14, the semiconductor layer 16, and the source and drain electrodes 18a and 18b are sequentially formed on the gate electrode 12.

More specifically, the gate insulating layer 14, an amorphous silicon (a-Si) layer, and an amorphous silicon layer doped with impurities (n+) are sequentially formed over the front surface of the first substrate including the gate electrode 12 by deposition such as a plasma enhanced chemical vapor deposition (PECVD), etc. Subsequently, after forming a source/drain metal layer by deposition such as sputtering, etc., the source/drain metal layer is patterned by a photolithography process using a second mask and an etching process, to form the semiconductor layer 16 consisting of an active layer 16b and an ohmic-contact layer 16a, the data line DL, and the source and drain electrodes 18a and 18b.

In this case, to electrically isolate the source electrode 18a and the drain electrode 18b from the ohmic contact layer 16a, a diffraction exposure or half-tone mask is used.

The gate insulating layer 14 is made of an inorganic insulating material such as silicon oxide (SiOx), silicon nitride (SiNx), or the like. The source/drain metal layer 18 is made of any one of molybdenum (Mo), titanium (Ti), tantalum (Ta), molybdenum-alloy (Mo-alloy), copper (Cu), and the like.

Figure 3C:
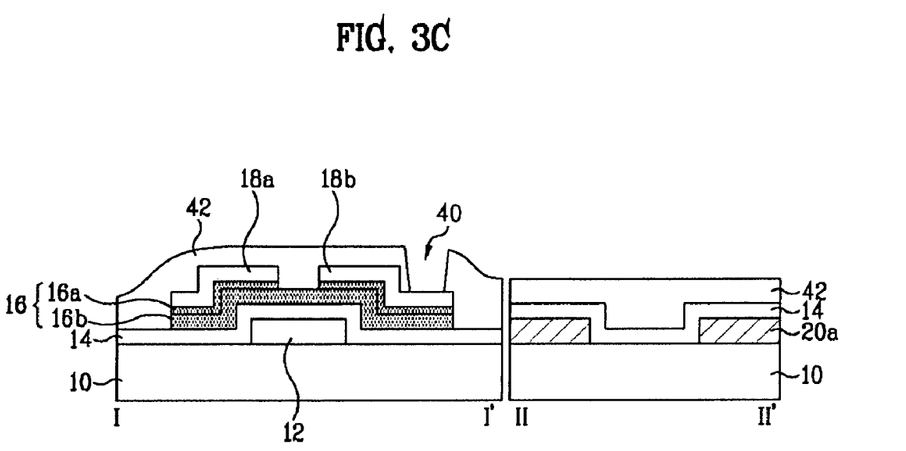

Referring to FIG. 3C, a protective layer 42 having a contact hole 40 is formed on the source and drain electrodes 18a and 18b.

Specifically, after forming the protective layer 42 on the source and drain electrodes 18a and 18b, the protective layer 42 is patterned by a photolithography process using a third mask and an etching process, to form the contact hole 40. The contact hole 40 is to expose the drain electrode 18b to the outside. The protective layer 42 may be formed by depositing an inorganic insulating material similar to that of the gate insulating layer 14 by use of, for example, a PECVD method, or may be formed by coating an acryl-based organic compound having a low dielectric constant or an organic insulating material such as benzocyclobuten (BCB) or perfluorocyclobutane (PFCB) by use of, for example, a spin or spin-less coating method.

Figure 3D:
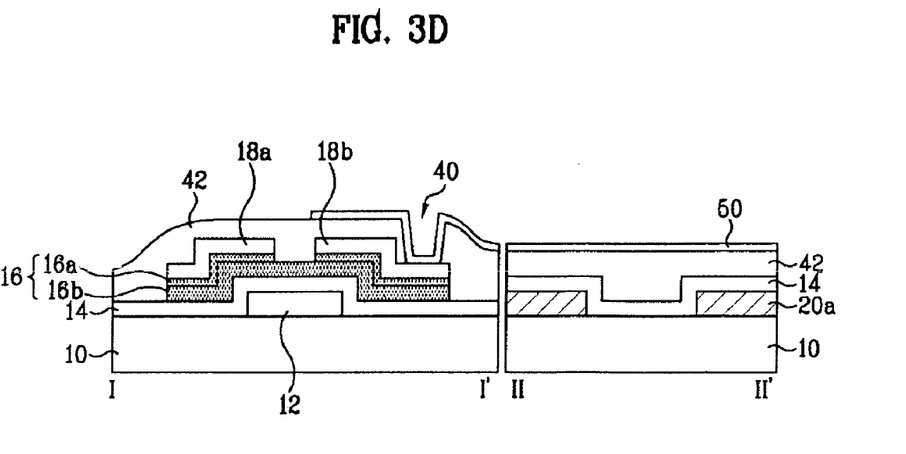

Referring to FIG. 3D, the pixel electrode 50 is formed on the protective layer 42, so as to be electrically connected with the drain electrode 18b.

More specifically, after a transparent conductive material is deposited on the protective layer 42, the transparent conductive material is patterned by a photolithography process using a fourth mask and an etching process, to form the pixel electrode 50 electrically connected with the drain electrode 18b. The pixel electrode 50 is overlapped with the common line 20 and the first and second common electrodes 20a and 20b while interposing the gate insulating layer 14 and the protective layer 42 therebetween. The pixel electrode 50 is also overlapped with the previous stage gate line GL'. The transparent conductive material is selected from among indium tin oxide (ITO), tin oxide (TO), indium zinc oxide (IZO), indium tin zinc oxide (ITZO), and the like.

If an open defect in the data line is detected during an inspection performed on the completed thin-film transistor substrate, it is necessary to perform a repair process for the open defect.

Figure 4A:
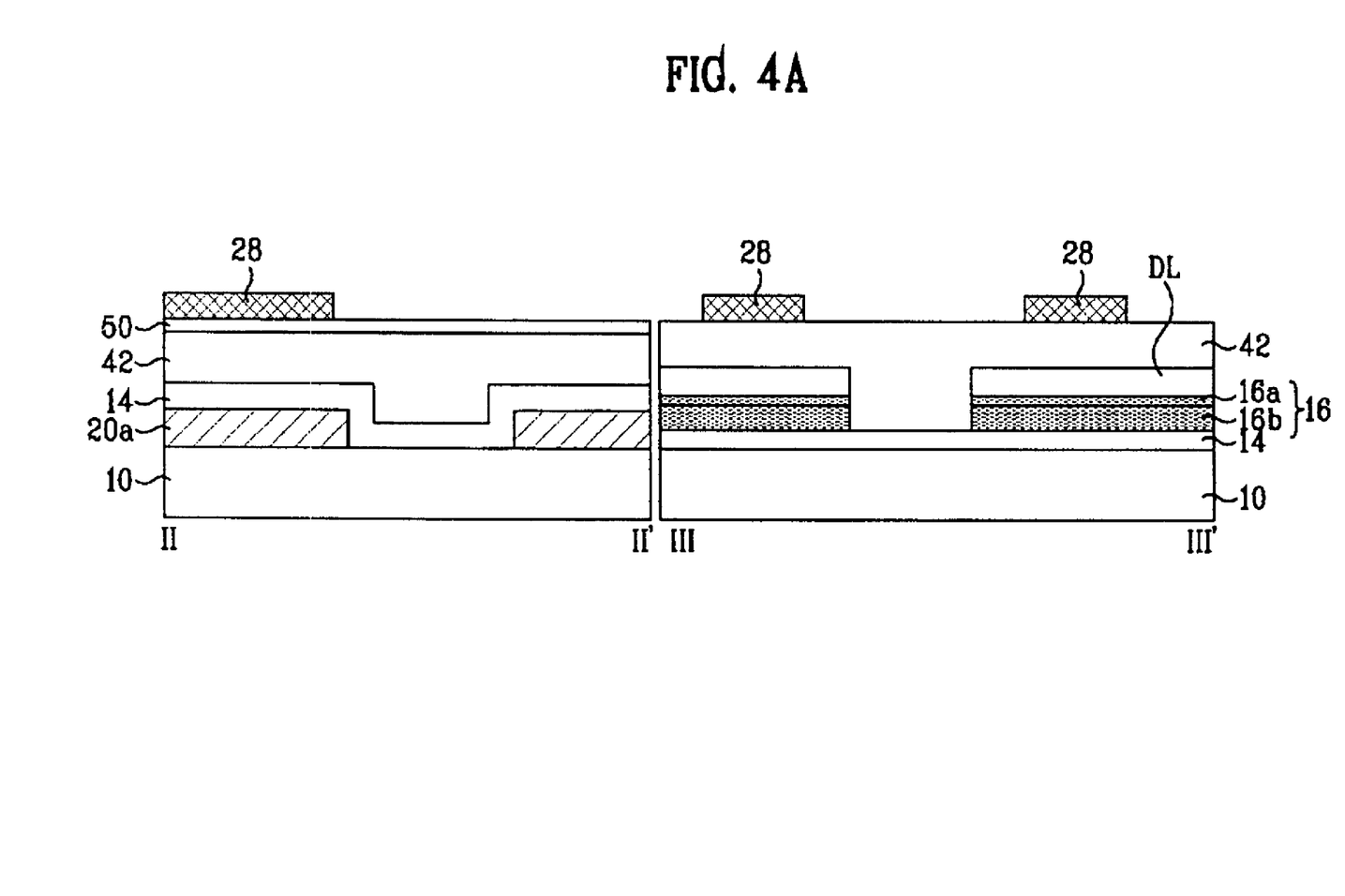
FIGS. 4A to 4C are sectional views taken along the lines II-II' and III-III' of FIG. 2, illustrating a repair process for a data line of the liquid crystal display device according to the present invention.
Figure 4B:
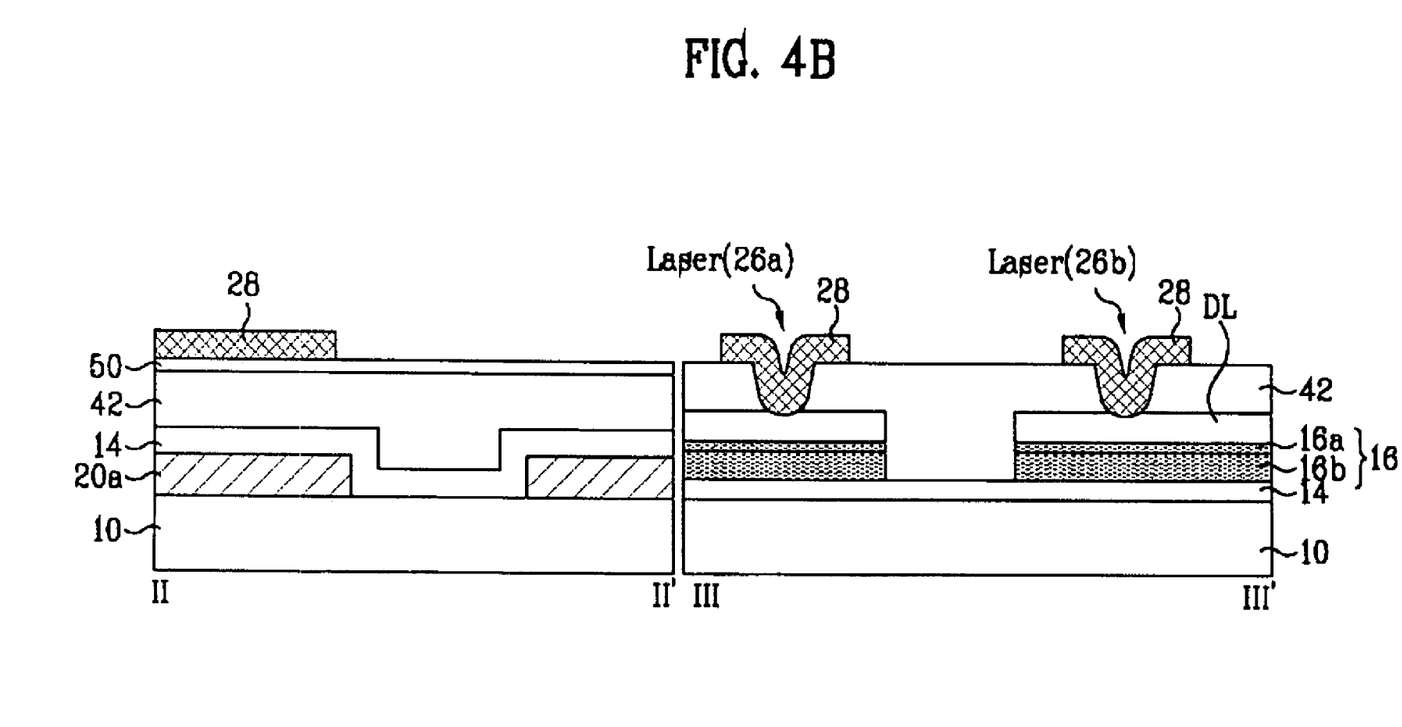
Figure 4D:
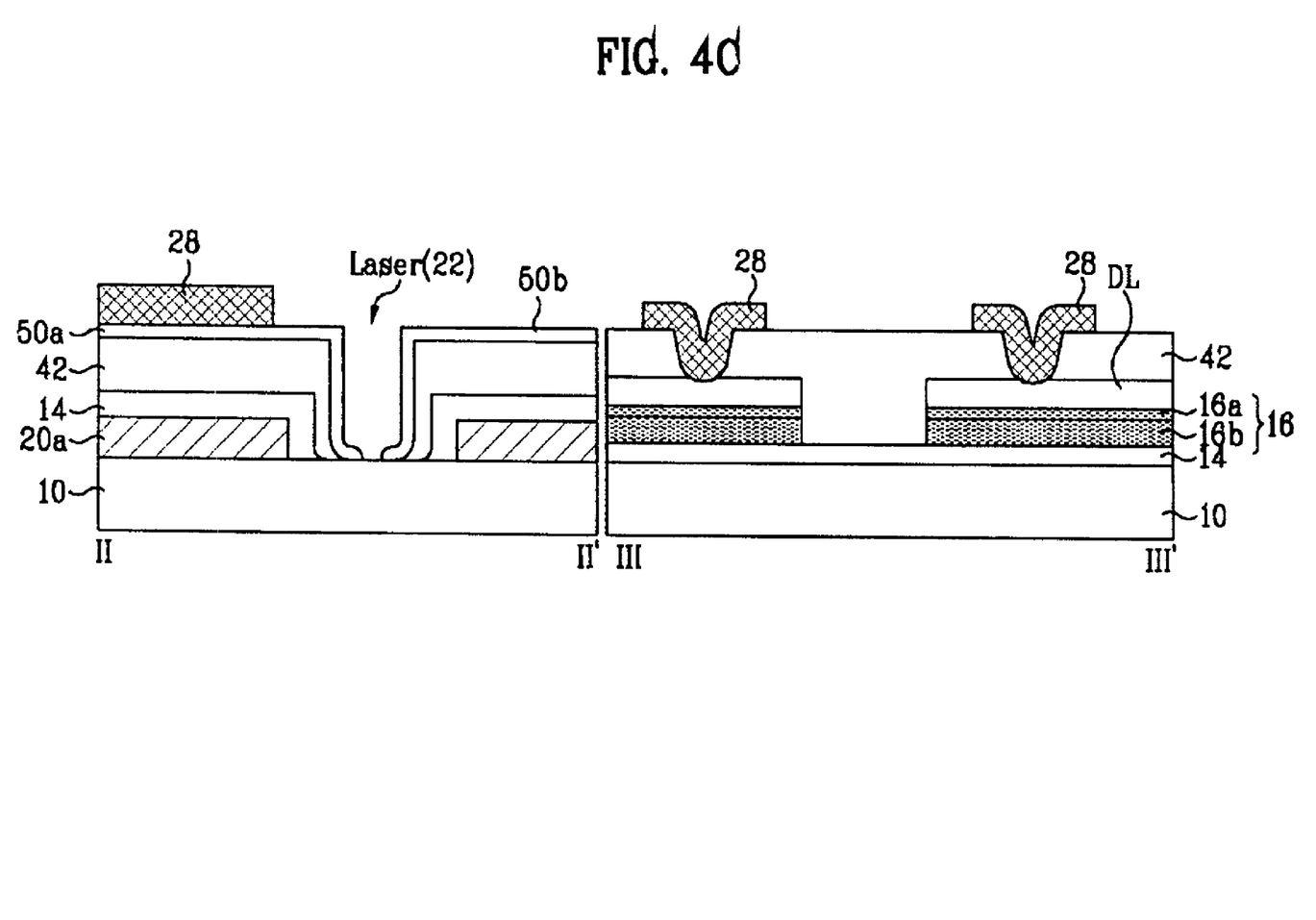

FIGS. 4A to 4C are sectional views illustrating a repair process for the data line shown in FIG. 2 according to the present invention.

Referring to FIGS. 2 and 4A, the connecting electrode 28 is formed on the protective layer 42 by a laser chemical vapor deposition such that the connecting electrode 28 is overlapped with both the separated portions of the open data line DL. In this case, the connecting electrode 28 has a "C"-shaped form protruding toward the adjacent pixel electrode 50 such that it is overlapped over the pixel electrode 50. Although the connecting electrode 28 is overlapped with the first common electrode 20a on the pixel electrode 50, the connecting electrode 28 is located so as not to be overlapped with the opened region of the first common electrode 20a.

Referring to FIG. 4B, laser beams are irradiated onto the overlapped portions between the connecting electrode 28 and the separated data lines DL, to weld the connecting electrode 28 with the separated data lines DL. Thereby, the connecting electrode 28 is connected with the separated data lines DL through the first and second welding points 26a and 26b.

Referring to FIG. 4C, the first portion 50a of the pixel electrode 50 coming into contact with the connecting electrode 28 is separated from the second portion 50b of the pixel electrode 50 connected with the thin-film transistor TFT by use of the laser cutting line 30. The laser cutting line 30 is formed along the outer periphery of the connecting electrode 28, to have a "C"-shaped form. In this case, a portion of the laser cutting line 30 above the connecting electrode 28 passes through a portion of the pixel electrode 50 not overlapped with the first common electrode 20a. On the other hand, a portion of the laser cutting line 30 below the connecting electrode 28 passes through a portion of the pixel electrode 50 overlapped with the opened region of the first common electrode 20a. With this configuration, it is possible to prevent a short circuit between the first common electrode 20a and the pixel electrode 50.

The second portion 50b of the pixel electrode 50 has a smaller area than other normal pixel electrodes, and may have a deviation in brightness under the condition of the same voltage. To solve this problem, laser beams are irradiated onto the previous stage gate line GL' overlapped with the second portion 50b of the pixel electrode 50 so as to electrically connect the previous stage gate line GL' with the second portion 50b of the pixel electrode 50. Thereby, a pixel located in the second portion 50b of the pixel electrode 50 is dark point, to display a black color. Such a dark point can be performed even prior to performing a laser cutting process after connecting the connecting electrode with the data line by laser welding.

As apparent from the above description, a liquid crystal display device and a repair method for the same according to the present invention have several effects as follows.

Firstly, when a data line has an open defect, according to the present invention, a connecting electrode is formed to connect the resulting separated data lines, which are separated from each other by an opened region therebetween. The formation of the connecting electrode prevents a short circuit problem, resulting in an improvement in the yield and productivity of the liquid crystal display device.

Secondly, by providing a first common electrode with an opened region and allowing a laser cutting line on a pixel electrode to pass through the opened region of the first common electrode, it is possible to prevent a short circuit between the first common electrode and the pixel electrode during a laser cutting process.

Thirdly, by irradiating laser beams onto a previous stage gate line so as to electrically connect the previous stage gate line with a portion of the pixel electrode separated by the laser cutting process, the corresponding pixel can be dark point. This has the effect of preventing a pixel defect caused upon the repair of the data line.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
a plurality of gate lines and data lines defining pixel regions on a substrate;
thin-film transistors formed at intersections of the gate lines and the data lines;
pixel electrodes formed at the respective pixel regions and connected with the thin-film transistors;
a first common electrode and a second common electrode overlapped with both side portions of each pixel electrode to extend parallel to the data lines;
an opened region of the first common electrode to divide the first common electrode into two parts in each pixel region;
a connecting electrode overlapped with both separated portions of an open data line and the pixel electrode adjacent to the open data line, the connecting electrode being connected with both the separated portions of the open data line by use of welding points; and
a cutting line to divide the pixel electrode into a first portion connected with the connecting electrode and a second portion connected with an associated one of the thin-film transistors, the cutting line passing through the opened region of the first common electrode.

2. The liquid crystal display device according to claim 1, wherein the connecting electrode has a "C"-shaped form.

3. The liquid crystal display device according to claim 1, further comprising:
a common line extending parallel to the gate lines and connected with the first common electrode and the second common electrode.

4. The liquid crystal display device according to claim 1, wherein each pixel electrode is overlapped with the previous stage gate line thereof.

5. The liquid crystal display device according to claim 1, further comprising:
a welding point to electrically connect the second portion of the pixel electrode with the previous stage gate line.

6. The liquid crystal display device according to claim 1, wherein the cutting line is formed along the outer periphery of the connecting electrode.

7. The liquid crystal display device according to claim 6, wherein the cutting line is not overlapped with the first common electrode.

8. A method for fabricating a liquid crystal display device comprising:
forming a plurality of gate lines and data lines defining pixel regions on a substrate;
forming thin-film transistors at intersections of the gate lines and the data lines;
forming pixel electrodes at the respective pixel regions so as to be connected with the thin-film transistors;
forming a first common electrode and a second common electrode extending parallel to the data lines and overlapped with both side portions of each pixel electrode;
forming an opened region of the first common electrode to divide the first common electrode into two parts in each pixel region;
forming a connecting electrode to be overlapped with both separated portions of an open data line and a pixel electrode adjacent to the open data line;
electrically connecting both the separated portions of the open data line with the connecting electrode by use of welding points;

forming a cutting line in the pixel electrode so as to pass through the opened region of the first common electrode; and dividing the pixel electrode, by use of the cutting line, into a first portion connected with the connecting electrode and a second portion connected with an associated one of the thin-film transistors.

9. The method according to claim 8, wherein each pixel electrode is overlapped with the previous stage gate line thereof.

10. The method according to claim 8, further comprising:

electrically connecting the second portion of the pixel electrode with the previous stage gate line by use of a welding point.

11. The method according to claim 10, wherein the electric connection between the second portion of the pixel electrode and the previous stage gate line is performed before or after a laser cutting operation.

12. The method according to claim 8, wherein the connecting electrode has a "C"-shaped form.

13. The method according to claim 11, wherein the connecting electrode is formed by a laser chemical vapor deposition.

14. The method according to claim 8, wherein the cutting line is formed along the outer periphery of the connecting electrode.

15. The method according to claim 13, wherein the cutting line is not overlapped with the first common electrode.

* * * * *